(12) United States Patent
Go

(10) Patent No.: US 7,165,787 B1
(45) Date of Patent: Jan. 23, 2007

(54) SAFETY DEVICE FOR MOTOR-VEHICLE STEERING COLUMN AND SEAT BELTS

(75) Inventor: Giok Djien Go, Pfahlgrabenstr. 45, D-65510 Idstein (DE)

(73) Assignee: Giok Djien Go

( * ) Notice: Subject to any disclaimer, the term of this patent is extended or adjusted under 35 U.S.C. 154(b) by 0 days.

(21) Appl. No.: 10/030,199

(22) PCT Filed: Mar. 10, 1998

(86) PCT No.: PCT/DE98/00694

§ 371 (c)(1),
(2), (4) Date: Feb. 14, 2004

(87) PCT Pub. No.: WO98/41422

PCT Pub. Date: Sep. 24, 1998

(30) Foreign Application Priority Data

Mar. 19, 1997 (DE) ................................ 197 11 392

(51) Int. Cl.
*B62D 1/19* (2006.01)
(52) U.S. Cl. ..................................... 280/777
(58) Field of Classification Search ................ 280/806, 280/777; 180/232, 274
See application file for complete search history.

(56) References Cited

U.S. PATENT DOCUMENTS

| | | | | |
|---|---|---|---|---|
| 4,566,555 A | * | 1/1986 | Schlanger | ................... 180/274 |
| 4,795,189 A | * | 1/1989 | Vollmer et al. | .......... 280/801.1 |
| 4,823,905 A | * | 4/1989 | Piech | ........................ 180/274 |
| 5,054,810 A | * | 10/1991 | Backhaus et al. | ........... 280/734 |
| 5,154,253 A | * | 10/1992 | Vollmer | ..................... 180/274 |
| 6,676,709 B1 | * | 1/2004 | de la Asuncion | .......... 280/784 |
| 6,851,505 B2 | * | 2/2005 | Motozawa et al. | ......... 180/274 |

* cited by examiner

*Primary Examiner*—David R. Dunn
*Assistant Examiner*—Leonard McCreary, Jr.
(74) *Attorney, Agent, or Firm*—Giok Djien Go

(57) ABSTRACT

As yet heads of belted passengers, when thrown forwards in real-world front collisions, crush into vehicle members or inflating airbags.

A safety device is equipped with wires, energy-absorbing, vibration-dampening delimiters, a collapsible upper portion of steering column and a pair of independently operating piston devices. The deflection of at least one piston rod in any front or rear collision is exploited to pre-tension the seat belts up to a predetermined length of seat-belt retraction and retract that collapsible upper portion with the steering wheel out of the head-injury area.

In order to prevent buckling of longitudinal runners, achieve the highest efficiency of energy-absorption and lower impact energy, to which passengers are exposed, a cone-shaped hub reams, folds and buckles the respective longitudinal runner, loosely guided by the piston rod, guided by a bearing box.

The delimiters block further movement of seat-belt wire thus preventing strangulation.

31 Claims, 8 Drawing Sheets

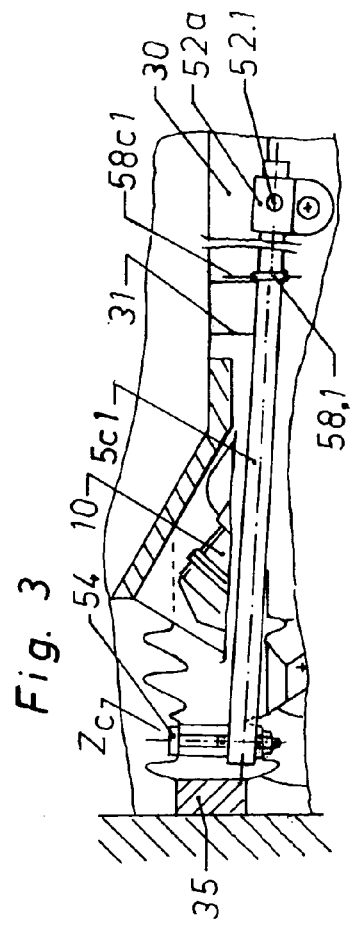
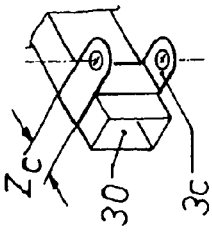
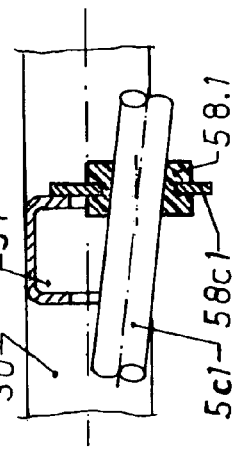
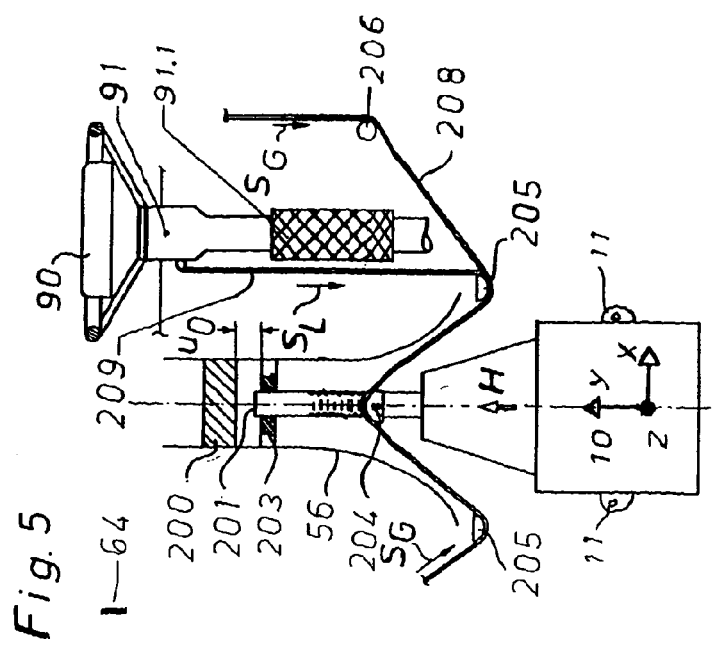

SAFETY DEVICE FOR MOTOR-VEHICLE STEERING COLUMN AND SEAT BELTS

CROSS REFERENCE TO RELATED APPLICATIONS

This is related to an international application number PCT/DE 98/00694 (WO 98/41422, German Patent DE 19711392 C1) filed Mar. 10, 1998.

BACKGROUND OF THE INVENTION

1. Field of the Invention

It is an object of the present invention to provide the front and/or rear section of vehicle body of motor vehicle with an energy-absorbing, vibration-dampening safety device
  to pull the steering wheel out of an area, in which the head, thrown forwards, smashes into it or is propelled backwards by an airbag;
  to damp vibrations and lower pre-tensioning forces, imposed on belted passengers, in association with energy absorption and vibration-dampening,
  to pre-tension the seat belts (safety belts) up to a predetermined length of seat-belt retraction and, when impact energy is great, to preserve the predetermined length of seat-belt retraction and to release pulling wires of the safety device
in any front or rear crash thus ensuring the survival chance either in co-operation with the front airbag or in case of a failure thereof or in operation with airbag.

2. Description of the Related Art

It is known in the prior art to provide a motor vehicle with front airbags to softly cushion the head or a safety device to pre-tension the seat belts in co-operation with the airbags while pulling the steering wheel out of a head-injury area in order to avoid head injury. When the head-injury area is violated in a front crash, the upper part of the body of a front-seated or back-seated passenger belted, more particularly slackly belted or unbelted, is propelled forwards into the steering wheel, windshield, dashboard or backrest of the front seat. Recently, conventional safety devices fail to ensure survival chance in the following cases:
  When crashing into a MB E200 DT on a highway, a 42-year old driver of 5-month old BMW 5, which is strongly yaw-accelerated, suffers quadriplegia.
  In a multi-crash of a 5-year old Ford Mondeo into a barrier and, finally, into a bus near the city of Idstein a 34-year old female driver submarines during which an inflating front airbag, fracturing her front face, forces it into her skull. Falsely deployed side airbags can injure passengers too!
  In a crash of a 3.5-month old BMW 328i into another BMW the head of a 34-year old driver, thrown forwards, totally deforms the steering wheel.
  The operation of airbags and sensors remains, to a surprising extent, unreliable, thus necessitating recall actions of 6,370 SAAB 9000s, 235,000 Volvo S70s, C70s and C70s, 150,000 MBs, 616,000 Opels, 16,500 VWs, 21,000 VWs, 280,000 BMW 3s, 900,000 AUDI 80s, A4s, A6s and A8s, 5,400 Porsche 911 Carreras and 911 Turbos and, recently, 116,000 Volvo S80s.
  Ref. to pp. 178 in German Magazine "AUTO MOTOR und SPORT" issue 12/2002 researchers of Technical University in the city of Aachen found out that over 10% of airbag systems are defective. Within four years two millions of cars were already recalled due to defective airbag systems. Under these circumstances airbag systems pose to passengers a risk of injuries!

In order to pre-tension the seat belts, operated by a belt pulley driven by an engine, the members of a release device ref. to DE 3536393 A1 are force-locking connected with each other by a wire (pp. 6/col. 37 to 43), which is activated in the event of deformation of a vehicle member. With the data n=6000 U/min, radius of belt pulley=10 mm and t=20 ms lower than the deployment time of BMW-Frontairbag by 22 ms the formula of seat belt-tension yields a retraction of 20 mm, which is less due to the slip-coefficient of the belt webbing on the belt pulley and due to its elongation and can never meet the requirement for retraction of from 300 to 350 mm.

In order to prevent fire the engine is put out of operation by interrupting the gasoline-supply and/or electric circuit. The release device remains ineffective at all.

Ref. to WO 90/14253 a front bumper consists of a first part, whereto a first row of rollers is transversely attached, a second part, whereto a second row of rollers is transversely attached, and a first strip member, arranged between both rows of rollers. Both ends of the first strip member are rigidly attached to a pair of movable rollers, about which a second strip member is wounded. Both ends of the second strip member, rigidly attached to seat belts of passengers. In a mid-front crash the deflection of the first rollers between the second rollers causes a lateral movement of both movable rollers in opposite direction during which the second strip member tightens both seat belts to a limited extent. In offset-crashes it does not work.

Despite voluminous form the front bumper is unsuited to absorb small energy when colliding into a barrier during parking. The damage on the device as well as on the front section of the vehicle incurs high repair costs.

Ref. to DE 4106480 A1 a clamping device consists of a front tube, fastened to a longitudinal runner, and a rear guide tube, which is fastened to the longitudinal runner and the front portion of which is loosely guided by the front tube, to loosely guide a wire. Under the premise, that the distance between both tubes is shorter, when the front portion is deformed, the wire pre-tensions seat belts of passengers. In real-world front crashes the device is fouled when
  the portion of the longitudinal runner together with the device collapses or
  the front portion with the device is not deformed while the front portion of the other longitudinal runner without device is deformed.

Ref. to EP 0234003 A1 a safety device, designed for a vehicle having mid- or rear-engine, has a pair of longitudinal rods, located in a pair of longitudinal runners, one ends of which and the other ends are fastened to the front portions of both longitudinal runners and to two first wires, which are connected to an intermediate wire in connection with two second wires, connected to the belt retractors. In a mid-front crash the deflection of both front portions of the longitudinal rods causes an elongation of both first wires, which are outwardly deflected upon the contact with guide plates of the longitudinal runners. As a result, both second wires activate the belt retractors to pre-tension the seat belts. Due to lack of vibration-dampening energy absorbers and delimiters the passengers are exposed to large acceleration of those rods, strangulation linked to unlimited deflection and whiplash-related oscillations.

Ref. to DE 3627558 C1 three wires of a safety device, activated by an intrusion of the power plant in a mid-front crash, pull the steering wheel out of the head-injury area and pre-tension all seat belts. Unfortunately, the passengers are subjected to severe/fatal injuries resulting from large acceleration, strangulation and whiplash-related oscillations in real-world mid-front crashes or failure of the safety device in real-world offset front crashes.

The deficiencies of the features of DE-OS 1655597, DE 3536393 A1, DE 3736949 A1, DE 4106480 A1, WO 85/01709 and WO 90/14253, respectively, are similar to that of EP 0234003 A1 and DE 3627558 C1

In order to resolve the above-mentioned deficiencies of EP 0234003 A1, DE 3627558 C1, WO 85/01709 A1 and DE 3736949 A1 the proprietor AUDI Corp. has invented a safety device, disclosed in DE 3801347 C2, under a trademark "procon-ten", an abbreviation for programmed contraction-tension, shown in FIG. 5. In a mid-front crash a rod 201 of the power plant 10 pulls a wire 208, which pre-tensions via pivots 204, 205, 206 seat belts 64 of all passengers in "SG"-direction and a wire 209, which pulls via two pivots 204, 205 a steering wheel 90 out of the head-injury area in "$S_L$"-direction during which a collapsible casing 91.1 of the steering column 91, fastened to a dash panel of the passenger compartment, is compressed.

Unfortunately, the safety device "procon-ten" incurs a series of drawbacks such as:

For years R&D work has been focused on developing compact as well subcompact cars suitable for daily driving to workplace, meeting with customers, resolving the problems of increasing traffic congestion, easily finding a parking lot and lowering the fuel consumption to under 4¹/₁₀₀km and improving the passenger protection to pass increasingly strict EU and US-crash tests.

A compact car, such as MB (Mercedes Benz) A-Class® with 3.58×1.56×1.72 m, has an extremely short front section, for which the device "procon-ten" is unsuited. In order to enhance survival chance and the energy-absorbing property of longitudinal runners in a mid-front crash the power plant 10, sliding down along the stiff sliding surface (scuttle) 55, is displaced from the engine compartment to underneath the passenger compartment while rear bearings 22, serving as sites of predetermined fracture, are broken, as exemplified in U.S. Pat. No. 5,492,193 and shown in FIGS. 2 and 3. In an offset front crash or in a major mid-front crash this embodiment fails due to fouling the condition that both rear bearings must be broken simultaneously. This and other shortcomings are resolved by features of separation of the power-plant from the front section of the vehicle body and/or by enhanced energy absorption of longitudinal runners in front- or rear crashes, disclosed in DE 19636167 C1, CA 2,236,816 and US-pending patent.

An Institute of Vehicle Safety, a Department of GDV (Association of German Insurers), in Munich has conducted a research on front crashes, classified into four front crash types one of which, the mid-front crash type, shows a low percentage just 19.3% regarding fatal injuries.

The upper part of body as well as the head are subjected to strong oscillation due to lack of undamped vibration in a front- or rear crash. In the crash tests, carried out by the Institute of Vehicle Safety in co-operation with Technical University in Graz, Austria, to idealize a real-world rear crash, the torso is propelled out of the seat backrest after a lapse of 40 ms (milliseconds) while the initial position of the head remains unchanged. After a lapse of 100 ms the head is accelerated backwards. After a lapse of 130 ms the head comes into contact with the head rest. The pitch acceleration reaches the maximum. A rebound (repetition of forward motion) of the upper part of body occurs within 200 ms. Despite low speed at 8.5 km/h and low acceleration at 2.5 g in the crash tests of nine different vehicle seats the upper part of body always oscillates. One out of 22 volunteers suffers minor cervical injury, lasting for two days, and a few minor pain, lasting for one to two days.

Due to poor energy-absorption of the rod 201 of the power-plant, far less than that of both deformable longitudinal runners having a peak acceleration of 60 m/s², disclosed in DE 3826958 A1, and due to great remaining impact energy, when crashing at high speeds into the very stiff column of a highway, the power plant intrudes into the passenger compartment and the seat belts, strongly pulled by the wire 208, strangulate all restrained passengers, particularly, a fetus of pregnant female passenger.

The rod 201 has to carry out five operations to limit the backward movement of the power plant, to absorb impact energy, to serve as the third bearing of the power plant, to adjust the wire and to convert the movement of the power plant into a movement of both wires. The failure of the device is due to the controversy of the different operations.

Ref. to DE 4224489 A1, whose features are found in AUDI A8 as well as A2, and DE 3826958 A1 a deformable longitudinal runner with a length of "$L_E$", shown in FIG. 10, is subdivided into "n+1" longitudinal members "$Z_1, Z_2, \ldots, Z_a, \ldots, Z_b, \ldots, Z_c, \ldots, Z_d, \ldots, Z_n, Z_{n+1}$". The longitudinal member "$Z_{n+1}$", having the largest stiffness, is the rear portion of the longitudinal runner, facing the passenger compartment.

Furthermore, DE 19615985 C1 (CA 2,249,667) and DE 19636167 C1 (CA 2,236,816 and US-pending patent) teach the stiffness of the longitudinal runner can be increased by additional elements integrating therein. Controllable deformation behaviour is accomplished by unequal stiffness of juxtaposed longitudinal members, under load, having different peak stresses. However, they may have peak stresses at the same level as long as their longitudinal members, for example, "$Z_2$" and "$Z_{10}$" are not in juxtaposition. The transient times to the yield value (fracture stress) are variable, hence, determinable. To resolve the problem of buckling of conventional longitudinal runner under great load and to achieve the highest efficiency of the energy absorption the deformable longitudinal runner, guided by the piston rod, is controllably folded, buckled and reamed by a cone- or torus-shaped hub 5.3 of piston head 5.1a, shown in FIG. 6.

SUMMARY OF THE INVENTION

Accordingly, the principle object of the present invention is to provide for a motor vehicle a safety device, comprising a pair of independently operating piston devices, arranged in the front and/or rear section of vehicle body, wires, pivots (pivotal rollers), and vibration-dampening, energy-absorbing delimiters in order to pre-tension the seat belts of all passengers and absorb the pre-tensioning forces to a predetermined length of seat-belt retraction, lower the belt forces, resulting from mass forces of the forward motion movement of the belted passengers, dampen whiplash-related oscillations of the belted passengers and pull the steering wheel out of a head-injury area in real-world front or rear crashes.

A second object of the present invention resides in the independently operating piston device having a cone- or torus-shaped hub which folds, buckles and reams the deformable longitudinal runner, being loosely guided by the piston rod, in order to gradually absorb impact energy and to achieve the highest efficiency of the energy absorption.

A third object of the present invention resides in a cost-, space-saving construction of different safety devices, each of which, provided with means to compensate manufacturing and assembly tolerances, can be installed in any motor vehicle, as exemplified in the compact car MB A, shown in FIGS. 2 and 3. A car manufacturer, having many vehicle classes (models) on the sales program, can equip them with one to two safety devices, whose wires 60, 61, 62 have a few different wire lengths and whose piston rods 5a to 5d have a few different wire lengths. In compliance with cost-, space-saving arrangement the following pair of piston rods 5, 5a to 5d, 5c1 can be arranged in the front and rear section of vehicle body of several vehicle models pursuant to the claims 1 to 3 and 26 to 28:

Ref. to FIGS. 1, 6 and 11 a wire-guiding member 52, to accommodate a wire and a delimiter and deform an additional energy absorber 1, is fastened to the rear portion of each piston rod 5, which is arranged in the longitudinal runner 30 and guided by a bearing box 30.7, 30.7a, rigidly attached to that and/or to the torque box 31.

Ref. to FIGS. 2 and 4 the front portion of each piston rod 5c, arranged sideward to the longitudinal runner 30, is bolted to the front portion of longitudinal runner 30, the mid-portion is loosely guided by a bearing 58c of reinforced dash panel 55 and a guide sleeve (member) 52a, to accommodate two wires, is fastened to the rear portion.

Ref. to FIGS. 3, 3a and 4 the front portion of each piston rod 5c1, arranged sideward to the longitudinal runner 30, is bolted to the front portion of longitudinal runner 30, the mid-portion is loosely guided by a bearing 58c1 of torque box 31 and a guide sleeve 52a, to accommodate two wires, is fastened to the rear portion.

Ref. to FIG. 7 the front portion of each piston rod 5d, arranged lower to the longitudinal runner 30, is bolted to the front portion of longitudinal runner 30, the mid-portion is loosely guided by a bearing 58d of torque box 31 and a guide sleeve 52a, to accommodate two wires, is fastened to the rear portion.

Ref. to FIG. 9 the front portion of each piston rod 5a, arranged upper to the longitudinal runner 30, is bolted to the front portion of longitudinal runner 30, the mid-portion is loosely guided by a bearing 58a of torque box 31 and a guide sleeve 52a, to accommodate two wires, is fastened to the rear portion.

Ref. to FIG. 10 the front portion of each piston rod 5b, arranged in the longitudinal runner 30, is bolted to the front portion of longitudinal runner 30, the mid-portion is loosely guided by a bearing 58b, which is a hole in the torque box 31, and a guide sleeve 52a, to accommodate two wires, is fastened to the rear portion.

Shown in FIG. 3a, the bearing 58a to 58d, 58c1 is provided with a soundproofing bush 58.1 to isolate noise and enhance the movement of the piston rod therein when being displaced together with the longitudinal runner 30. Accordingly, piston rods 5c, 5c1, 5d, 5b are provided with soundproofing bushes, like 54.1, shown in FIG. 9, at the respective attachment points. To save assembly time the hole of piston rod 5b is pre-assembled with rubber sleeve (not drawn).

The profile of piston rods 5a to 5d, 5c1, 5e1 to 5e4 is arbitrary, however preferably, round or square due to low manufacturing costs.

Usually, manufacturing tolerances and indeterminate (large) assembly tolerances result in a play which must be compensated by repositioning the wire to the piston rod, to the delimiter and/or to the clamping member of the delimiter and/or the piston rod to the longitudinal runner. This requirement for an appropriate position of the wire is met by distributing the following adjusting holes along the following members of the safety device:

adjusting holes "$H_1, H_2, \ldots, H_n$", along piston rod 5d (FIG. 7), adjusting holes "$K_1, K_2, \ldots, K_n$" along piston rod 5a, 5b, 5d (FIGS. 7, 9, 10), adjusting holes "$L_1, L_2, \ldots, L_n$" and "$N_1, N_2, \ldots, N_n$" along energy-absorbing steering-column delimiter 51 with site of predetermined fracture "b" (FIG. 11), adjusting holes "$N_1, N_2, \ldots, N_n$" along energy-absorbing steering-column delimiter 51a, 51c, 51d, 51e with site of predetermined fracture "b" (FIGS. 8, 9 and 19 to 21) and/or adjusting holes "$M_1, M_2, \ldots, M_n$" along tube 71.1 or clamping member 82, 82a, 82b (FIGS. 12 to 16).

Alternatively, a spacer 60.6 with open profile and length of "$g_1$" is clamped onto a pre-wire 60.1e, preferably, in front of the blocking ring 60.7 to correct the distance of "g" between the blocking ring 60.7 and support plate 60.8, fixed to the side rail 34, shown in FIG. 21. The process of clamping is illustrated by an arrow. The adjusting work can be done elsewhere upon allocation of a number of spacers 60.6 with different lengths "$g_1, g_2, \ldots, g_m, g_n$" (not shown).

In a time-, cost-saving decision an assembly worker at assembly line can compensate a play by occupying, for example, an appropriate hole "$L_3$" (FIG. 11) for fastener 51.2 of energy-absorbing steering-column delimiter 51 instead of the designed hole "$L_1$" and/or by clamping a spacer 60.6 with open profile and length of "$g_1$" to the pre-wire of wire 61, 62.

A fourth object of the present invention facilitates the safety device to co-operate with a separation of the power plant ref. to DE 19636167 C1 (CA 2,236,816 and US-pending patent) and with additional energy absorbers ref. to DE 19615985 C1 (CA 2,249,667), such as energy absorbers 1, shown in FIGS. 1, 6 and 11, in order ensure and enhance survival chance and, in particular, resolve the crash incompatibility issue, in which a light car, for example, a subcompact or compact car, is front-end hit by a utility vehicle, for example, a pickup, truck or SUV. As reported in IIHS Vol. 34, No. 9, Oct. 30, 1999, two-vehicle collisions between cars and utility vehicles in USA account for about 15 percent of all car occupant deaths.

In surmounting the foregoing shortcomings of conventional safety devices and, in particular, the failure in offset front crashes or major accidents all the objects ensure the operation of the safety device as well as survival chance in real-world front or rear crashes, illustrated in FIGS. 1 to 3 and 6 to 10, where in an offset front or rear crash, when "F>F", the piston rod 5 moves (backwards) along the y2x-axis or, when "F>F", the other piston rod 5 moves along the y2-axis, or in a mid-front or mid-rear crash, when "F=F", both piston rods 5 move along the y2- and y2-axis.

During which impact energy is absorbed by at least one longitudinal runner 30 and by at least two pairs of vibration-dampening, energy-absorbing delimiters 70, 80, 80a to 80e with site of predetermined fracture "b", shown in FIGS. 12 to 21, and, optionally, by at least one deformable element 1, shown in FIGS. 1 to 6.

Obviously, the operation to pre-tension seat belts in direction "$S_0$" has to be separated from that to retract the steering wheel out of the head-injury area independent of direction "$S_1$" and "$S_2$". The retraction must be limited by at least one energy-absorbing steering-column delimiter 51, 51a with site of predetermined fracture "b" (FIGS. 8, 9 and 11). Both features are extended by the following features. Each vibration-dampening, energy-absorbing delimiter 70, 80, 80a to 80e, shown in FIGS. 1, 12 to 21, has a multi-purpose:

- to perform work of deformation and of friction, thus absorbing (dissipate) impact energy, lowering the pre-tensioning force of seat belts, by fracturing the sites of predetermined fracture "b" in excess of a predetermined value, and damping whiplash-related oscillations, to which the heads are exposed,
- to limit (restrict) the retraction-length of seat belts in order to prevent strangulation and
- to preserve lengths of retracted seat belts and the clamping force of the clamping member on the retaining member by way of engagement of retaining assembly, consisting of
  - retaining notch of tube 71.1 and retaining plate 71.3, pivotally attached to both plates 71.4 and biased by spring 71.5, shown in FIG. 12, or
  - a pair of retaining apertures of expanding clamping member 82a and two-side retaining strut 81.2a of retaining member 81a, shown in FIGS. 14 and 15, or
  - a retaining collar 82.1b of contracting clamping member 82b and retaining notch of retaining member 81b, shown in FIGS. 16 to 18.

Clamping (spring) force of the clamping member on the retaining member depends on the material, length, denoted by "1", longitudinally variable width of gap, denoted by "s", shape of the delimiter itself and spring rate of the clamping member, which expands or contracts, during its forced movement along the cone-shaped portion of the retaining member. Applying the same parameters on the design of the delimiter and the cone-shaped portion of the retaining member, the clamping force of the clamping cylinder-shaped member 82 with diameter of "$d_0$" is less than that of the clamping cone-shaped member 82a. For the purpose of ideal contact with each other the portion 81.3a to 81.3e of retaining member 81a to 81e and clamping member 82a to 82e have the same conical shape, determined by the formula "$(D_2-D_1)/L=(d_2-d_1)/1$", shown in FIGS. 14 to 21. Owing to these features

- the expansion or contraction of the clamping member increases the clamping force and
- work of deformation and of friction is accomplished when the clamping member, whose gap is loosely guided by the part of the mating retaining member, moves along the retaining member.

Due to longitudinally contracting the circumference of clamping member with diameter "$D_2$" and "$D_1$" to an amount of, for example, 0.5 mm the clamping force of the delimiter 80a, 80c is increased accordingly.

Each delimiter 80, 80a to 80e under load of pre-clamping force can be pre-assembled by

- expanding the clamping member 82, 82a, 82c with gap, arranged on the retaining member 81, 81a, 81c, or
- contracting the clamping member 82b, 82d with gap, arranged in the retaining member 81b, 81d.

Owing to big friction coefficient, large contact area of clamping member with retaining member and wide expansion or contraction the clamping force is strong enough to pre-tension and retain the seat belts. A test can determine whether the cheapest delimiter 80e without retaining and blocking parts, shown in FIG. 21, works. It consists of

- a retaining member 81e representing any one of members 81, 81a to 81d and
- a clamping member 82e representing any one of members 82, 82a to 82d without retaining and blocking parts, however, with alien-blocking parts 60.6 to 60.8.

To avoid noises the cone-shaped portion of retaining member 81, 81a to 81e is surrounded by a soundproofing material 83, shown in FIG. 15. The work of friction depends on clamping force, surface property of both members on contact and friction coefficient. The work of deformation, friction is achieved during the deformation of clamping member, pulled by the wire 60, moved along the retaining member, similar to spring 72 and shock absorber 73.

BRIEF DESCRIPTION OF THE DRAWINGS

A number of embodiments, other advantages and features of the present invention will be described in the accompanying drawings with reference to the xyz global coordinate system:

FIGS. 2 and 3 illustrate a longitudinal cross section of a transversally-built power plant of MB A being displaced ref. to U.S. Pat. No. 5,492,193 and a 3rd and a 4th embodiment of the safety device in a mid-front crash.

FIG. 3a is a partially enlarged cross-sectional view of a bearing 58c with a soundproofing bush 58.1 to guide each piston rod 5c1 of the safety device, shown in FIG. 3.

FIG. 4 is a perspective view of the longitudinal runner 30, whose longitudinal member "$Z_c$", reinforced by an additional element 3c, accommodates the front portion of the piston rod, shown in FIGS. 2 and 3.

FIG. 5 is a perspective view of an AUDI safety device "procon-ten" ref. to DE 3801347 C2.

FIG. 8 is a cross-sectional view of a 6th embodiment of the safety device, along the line II—II of FIG. 9, having an energy-absorbing steering-column delimiter 51a and a spacer 51.6a with open profile and length of "$f_1$" which is in process to be clamped onto a wire 61 to correct the distance of "f" between the blocking ring 51.4a and support plate 51.5a.

FIG. 9 is a schematic perspective view of a half of the 6th embodiment of the safety device with piston rod 5a, wires 60, 61, guide sleeve 52a, pivots 44a, 47a, 48 and the energy-absorbing steering-column delimiter 51a.

FIG. 14 is a schematic perspective view of a 3rd embodiment of the energy-absorbing, vibration-dampening delimiter 80a.

DESCRIPTION OF THE PREFERRED EMBODIMENTS

Figure 1:
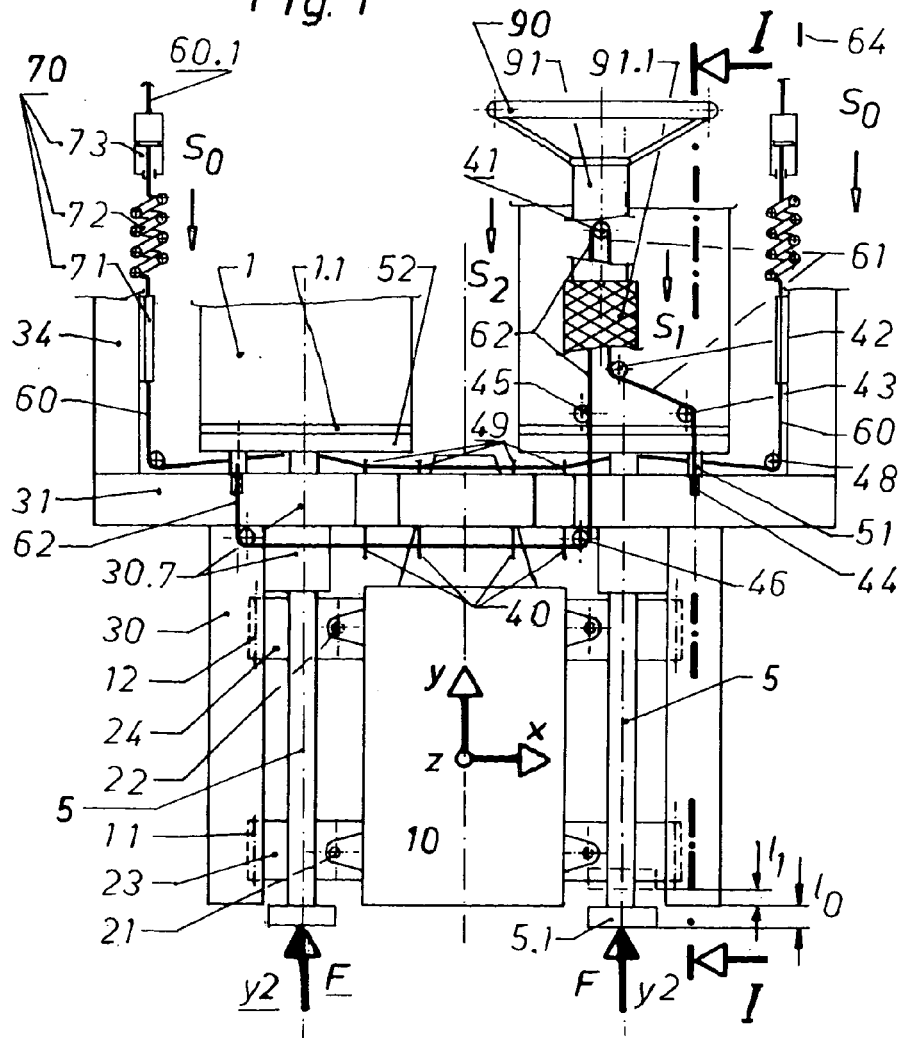
FIG. 1 is a schematic view of a vehicle frame, a power plant 10, steering wheel 90, steering column 91 and a pair of deformable elements 1, loosely guided by wire-guiding members 52, and a 1st embodiment of the safety device, having a pair of independently operating piston rods 5 with piston heads 5.1, guided by bearing boxes 30.7, which are arranged to a pair of longitudinal runners and/or a torque box 31, wires 60 to 62, energy-absorbing steering-column delimiters 51, pivots 40 to 49 and a 1 st embodiment of two pairs of energy-absorbing, vibration-dampening delimiters 70 in xy-plane.
Figure 2:
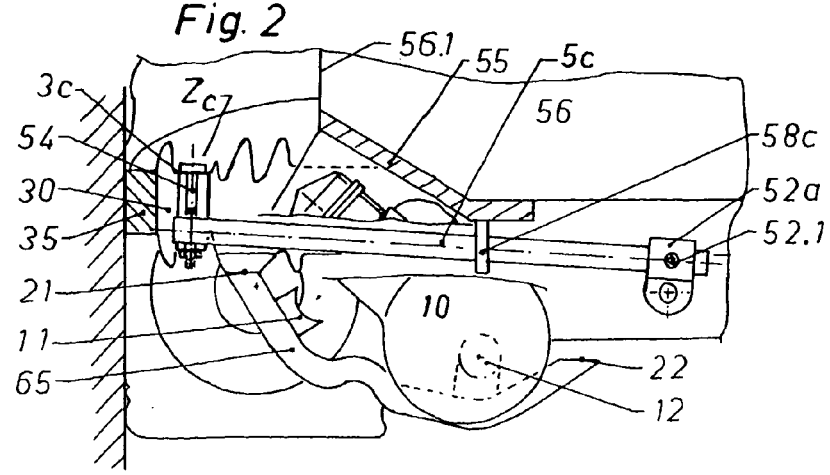

The right-hand drive vehicle is represented by the steering wheel 90, shown in FIGS. 1 and 5. However, all features are suited for right-hand drive vehicles as well as for left-hand drive vehicles.

Figure 6:
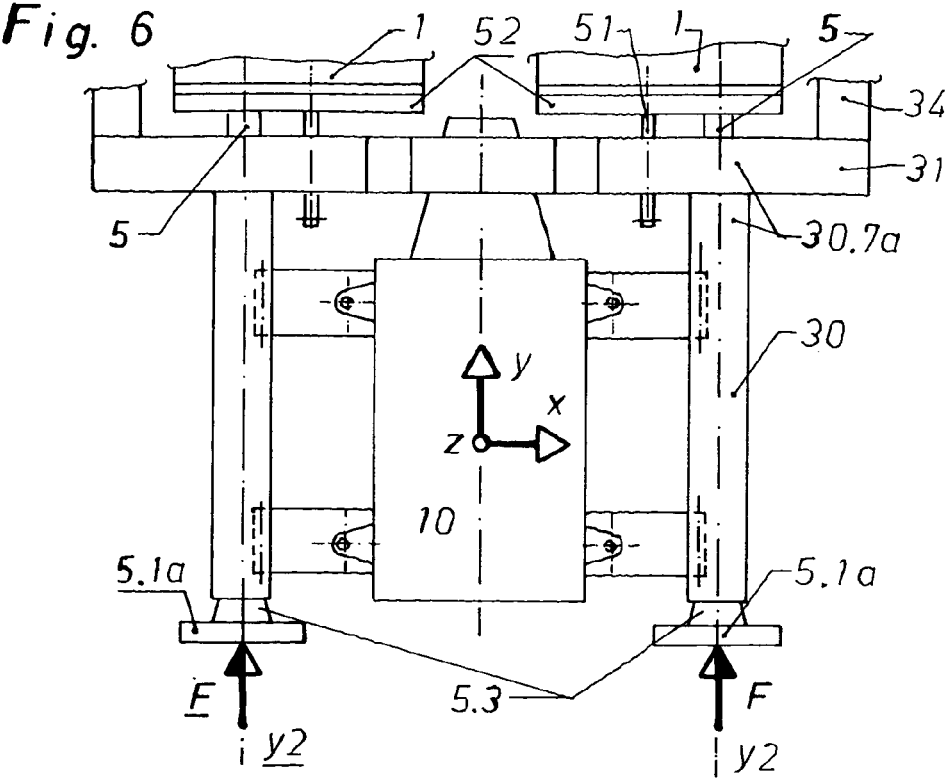
FIG. 6 is a schematic view of a vehicle frame, a power plant 10 and a pair of deformable elements 1, loosely guided by wire-guiding members 52, and a 2nd embodiment of the safety device, having a pair of independently operating piston rods 5 with cone- or torus-shaped hubs 5.3 and piston heads 5.1a, guided by bearing boxes 30.7a, arranged to a pair of longitudinal runners and/or a torque box 31, and delimiters.
Figure 7:
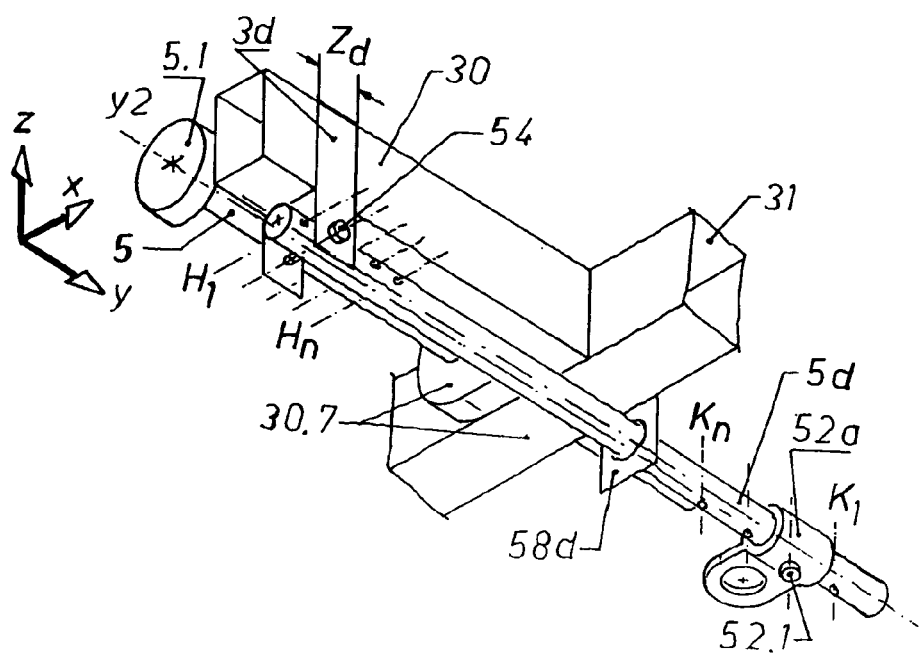
FIG. 7 is a perspective view of a longitudinal runner 30, whose longitudinal member "$Z_d$", reinforced by an additional element 3d, accommodates a piston rod 5d of a 5th embodiment of the safety device.

The 2nd embodiment of the safety device, shown in FIG. 6, differs from the 1st embodiment, shown in FIG. 1, in the piston rods 5.1a, provided with cone- or torus-shaped hubs 5.3 which avoid an extremely outward deflection of longitudinal runners during deforming, reaming and folding the longitudinal members in longitudinal direction to substantially dissipate great impact energy.

Figure 11:
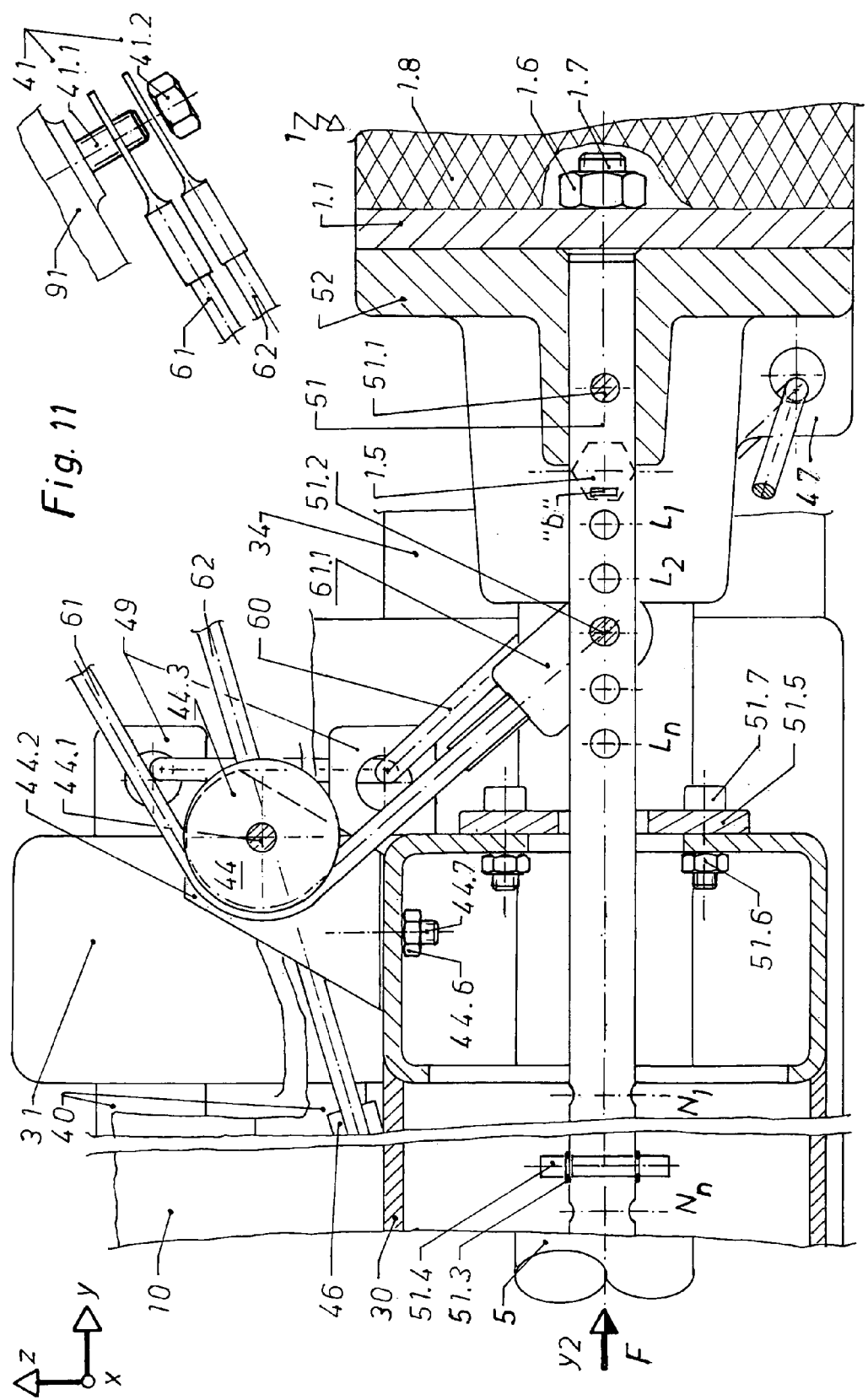
FIG. 11 is a cross-sectional view of the 1st embodiment of the safety device and the energy-absorbing delimiter 51 along the line I—I of FIG. 1.

The end portion of each piston rod 5, guided by bearing box 30.7, 30.7a, is fastened to a wire-guiding member 52 of deformable element 1, shown in FIGS. 1, 6 and 11, which has a web with a hole, serving as pivot 47 to pivotally move and deflect the wire 60. The wire 60, further wound about the pivots 48, 49, has both ends, attached to at least one pair of delimiters 70, 80, 80a to 80e in connection with all seat belts of the motor vehicle.

Each wire-guiding member 52 accommodates an energy-absorbing steering-column delimiter 51, one of the adjusting holes of which is occupied by one end of wire 61, 62. Onto the other ends wire holders 61.1, 61.2 are clamped. Both wires are wound about the respective pivots 42, 43 and 45, 46. Threaded stud 41.1, accommodating both wire holders, has a threaded end projection onto which a nut 41.2 is screwed to secure them.

Figure 8:
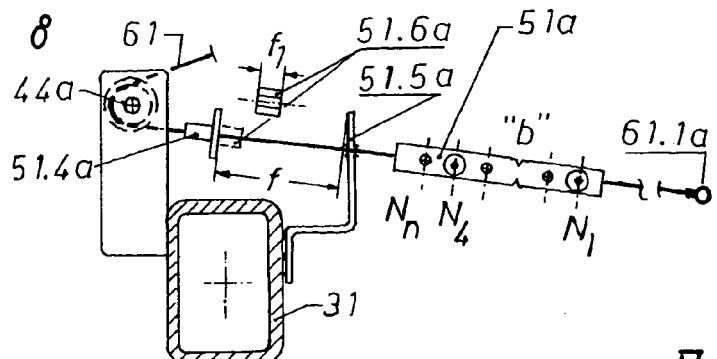
Figure 9:
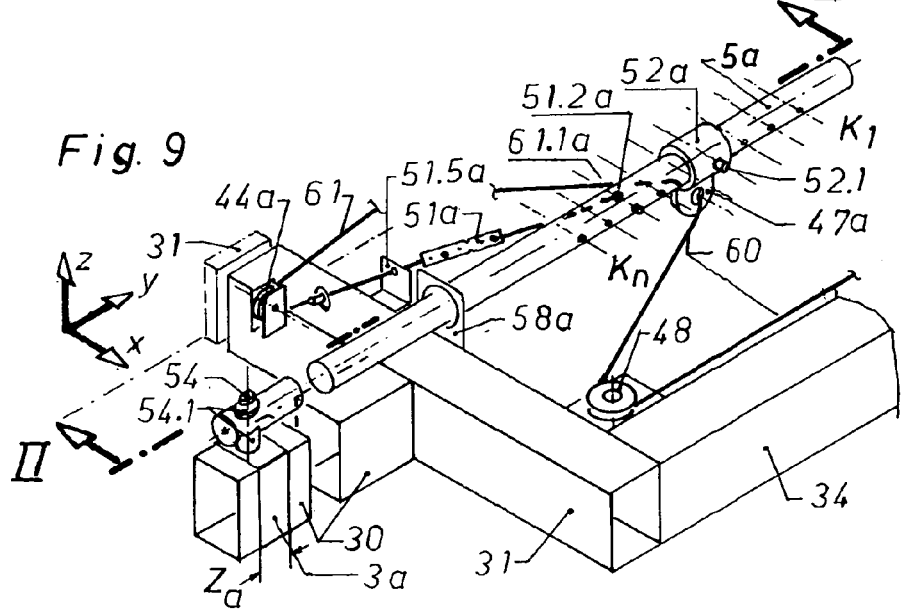
Figure 10:
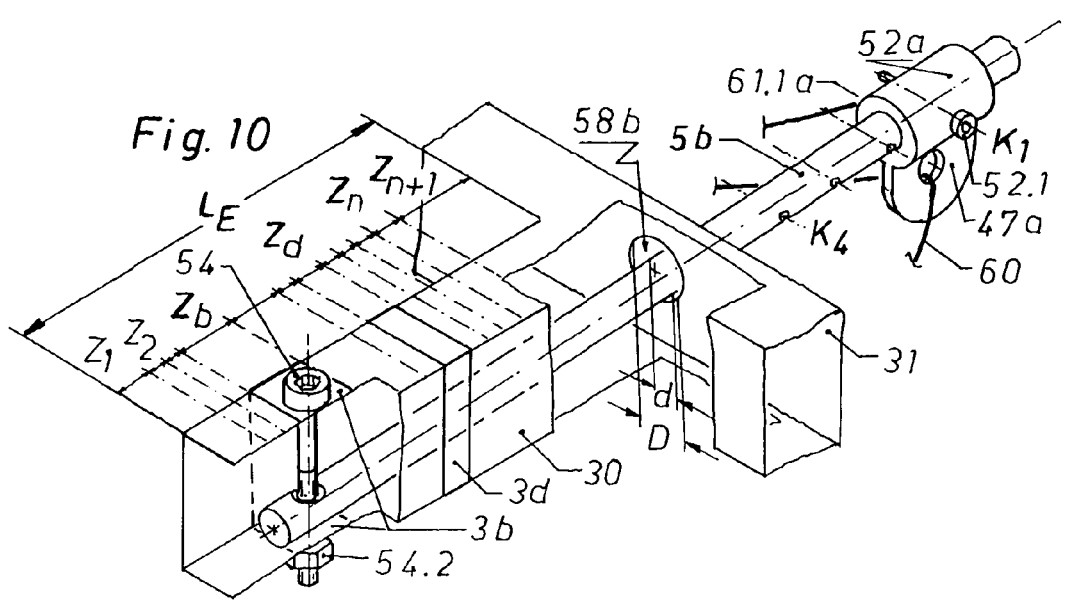
FIG. 10 is a schematic perspective view of the longitudinal runner 30, subdivided into "n+1" longitudinal members one "$Z_b$" of which is reinforced by an additional element 3b to accommodate a piston rod 5b of a 7th embodiment of the safety device.

Upon large deflection of wire-guiding member 52 in an offset front crash the seat belts 64 of belted passengers are pre-tensioned up to a predetermined length of seat-belt retraction, vibration is dampened, energy is absorbed by deforming the longitudinal runner 30, deformable element 1 and the delimiters 70, 80, 80a to 80e, 51, 51a and the movement of blocking pin 51.4 is blocked by support plate 51.5 thus ending up in fracture of site of predetermined fracture "b" and in further pulling of the steering wheel 90 until it comes into contact with the dashboard. As a result, the site of predetermined fracture "b" of the energy-absorbing steering-column delimiter 51a (FIG. 8) is broken and the wire 61, 62 is released. Alternatively, only one single pair of energy-absorbing steering-column delimiters 51 is used. In that case the site of predetermined fracture "b" has to be redesigned between the hole "$L_1$" and the wire-guiding member 52 (FIG. 11). Car Corps. have an option for a single or multi-energy absorption.

Due to great impact energy the wire 60 is released too and the predetermined length of seat-belt retraction and the clamping force are conserved, as outlined hereinafter.

Figure 12:
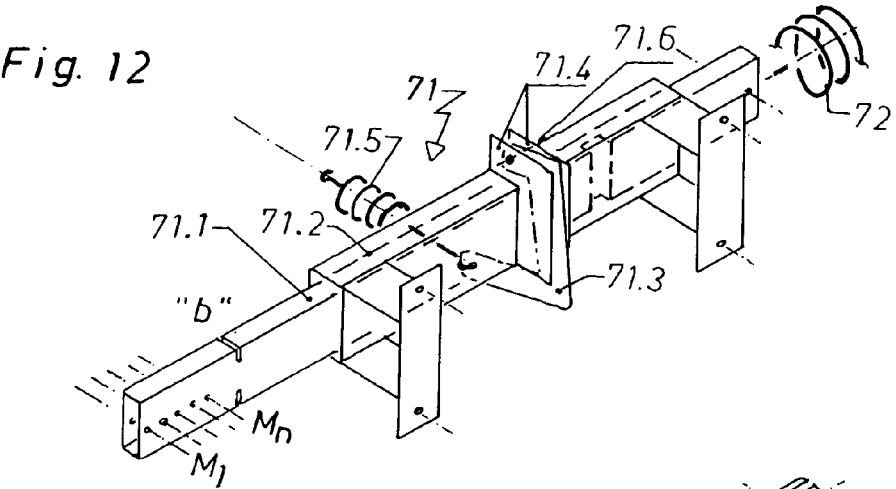
FIG. 12 is a schematic perspective view of the delimiter 70 having a delimiting unit 71.

In the 1st embodiment the delimiter 70, shown in FIGS. 1 and 12, comprises a spring 72, shock absorber 73 and a delimiting unit 71, consisting of a tube 71.1 and support member 71.2 with plate 71.3, which, biased by spring 71.5, comes in engagement with a notch of the tube, being moved by tension force of wire 60, to limit the retraction-length of seat belts. The non-recurring delimiter 70 is too expensive. Car Corps. are interested more in cost-, space saving embodiments, which are described hereinafter:

In the 3rd to 7th embodiments of the safety devices without costly bearing boxes 30.7, 30.7a, shown in FIGS. 2, 3, 7, 9 and 10, a pair of piston rods 5a to 5d, 5c1 is arranged in or to the longitudinal runners 30. The piston rod provided with bush such as 54.1 is in force-locking connection with the reinforced longitudinal member by way of riveting or welding or a fastener, consisting of bolt 54 and nut 54.2, shown in FIG. 9. Costs are further saved by multi-use of the fastener 52.1 to fasten the wire holder 61.1a of wire 61 to guide sleeve 52a, shown in FIGS. 9 and 10, and the guide sleeve 52a to piston rod 5a, 5b as well as by multi-use of the guide sleeve 52a to retain those wires and to pivotally move and deflect the wire 60.

Figure 19:
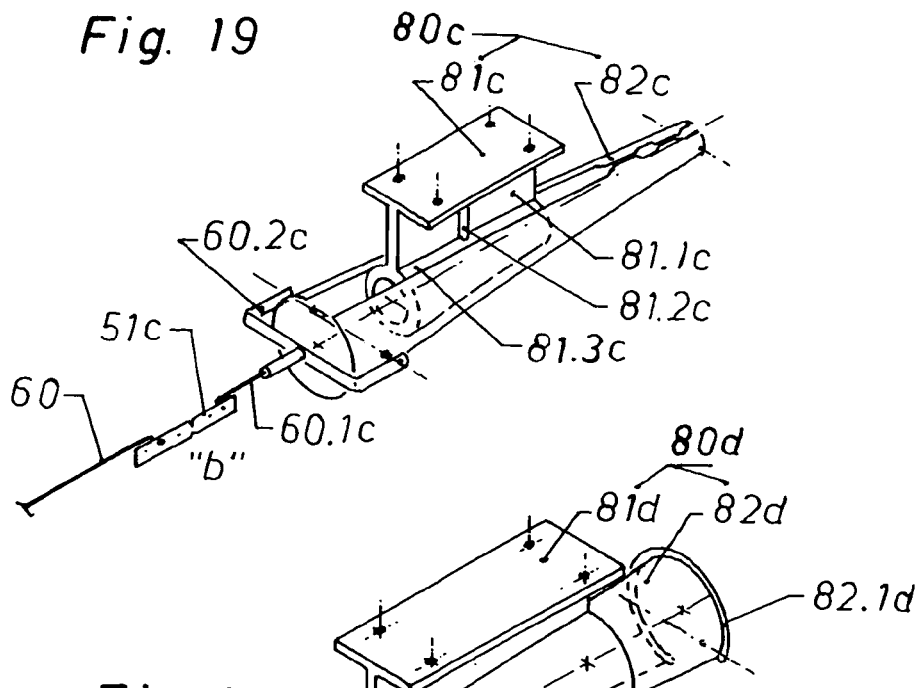
FIG. 19 is a schematic perspective view of a 5th embodiment of the energy-absorbing, vibration-dampening delimiter 80c.
Figure 20:
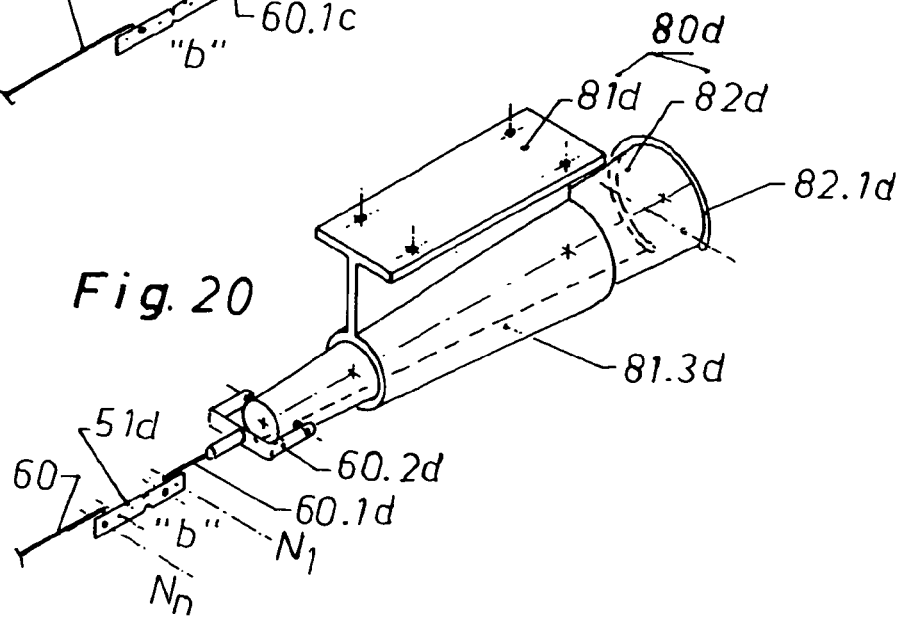
FIG. 20 is a schematic perspective view of a 6th embodiment of the energy-absorbing, vibration-dampening delimiter 80d.
Figure 21:
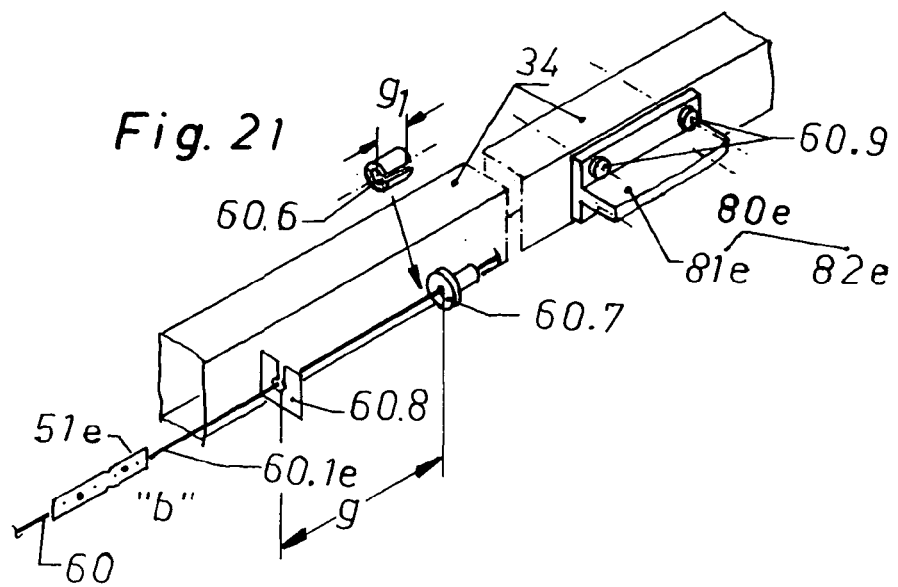
FIG. 21 is a schematic perspective view of a 7th embodiment of the energy-absorbing, vibration-dampening delimiter 80e.

Each retaining member of energy-absorbing, vibration-dampening delimiter 70, 80, 80a to 80e, shown in FIGS. 1, 12 to 21, has attachment points for the purpose of force-locking connection with any stiff motor-vehicle member like side rail 34, shown in FIG. 21.

Each member 71.1, 82, 82a to 82c, movable by tension force of wire 60, is provided with site of predetermined fracture "b" to limit the retraction-length of seat belts. Alternatively, the delimiters 80*d*, 80*e* in co-operation with delimiters 51*a* to 51*e*, each having site of predetermined fracture "b", are put into use.

Figure 13:
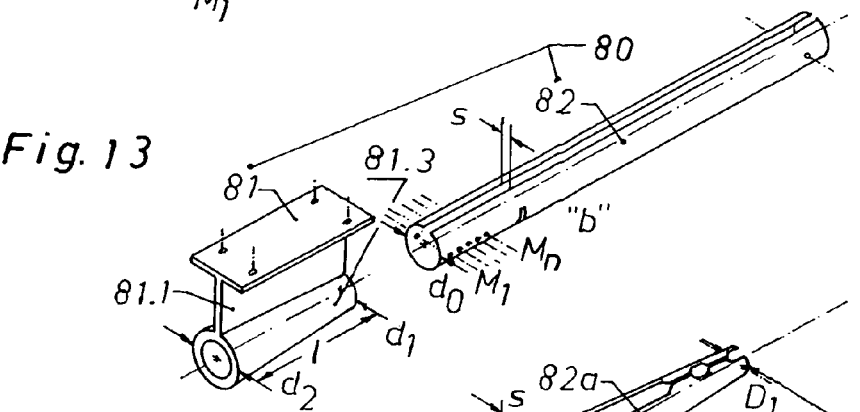
FIG. 13 is a schematic perspective view of a 2nd embodiment of the energy-absorbing, vibration-dampening delimiter 80.
Figure 14:
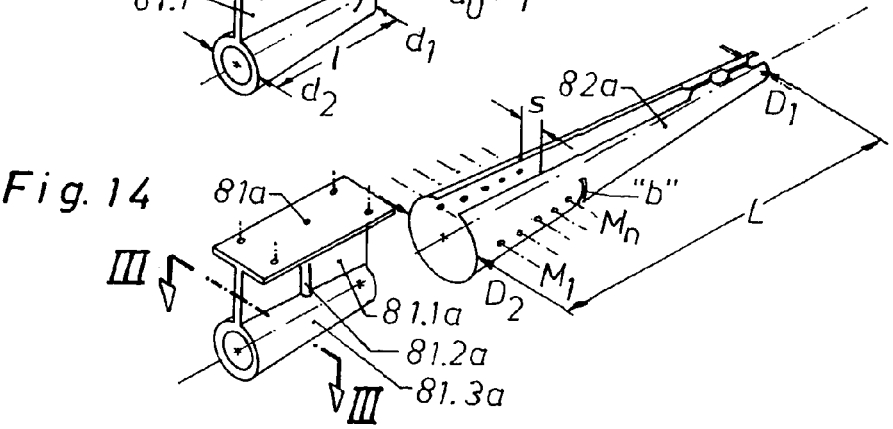
Figure 15:
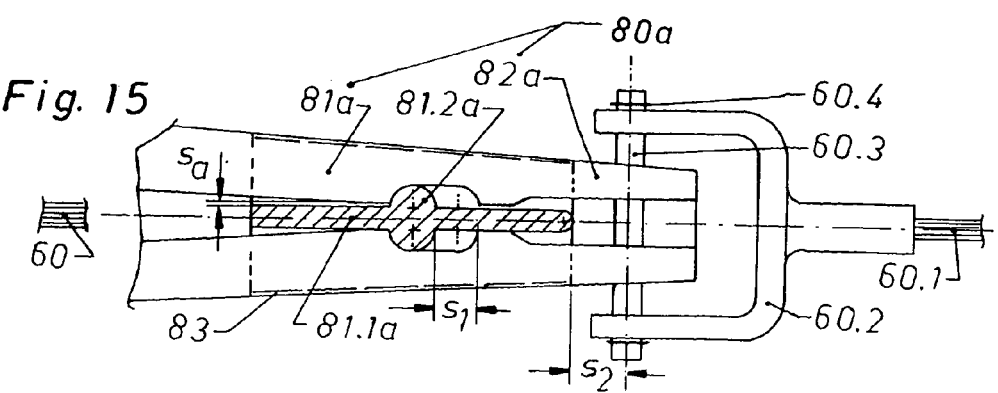
FIG. 15 is a cross-sectional view of a clamping member 82a of the delimiter 80a whose movement, guided by a longitudinal strut 81.1a of retaining member 81a and/or a retaining strut 81.2a, is blocked by a pair of retaining apertures in engagement with the retaining strut 81.2a along the line III—III of FIG. 14.

In the 2nd and 3rd embodiment the delimiter 80, 80*a*, shown in FIGS. 13 to 15, comprises an expanding clamping member 82, 82*a* and a retaining member 81, 81*a*. The work of deformation and friction is increased when the mating members, being in contact with each other, are cone-shaped. A gap, denoted by "s", has influence on the spring rate or clamping force and the engagement of both members with each other. Owing to the guide assembly, consisting of the gap and the strut 81.1, 81.1*a*, the clamping member 82, 82*a*, loosely guided by the strut, moves along the retaining member 81, 81*a*. To maximize the clamping force of clamping member 82*a* moving along the retaining member 81*a*, a longitudinal gap "$S_A$" (not drawn) must be defined by the magnitude of longitudinal gap "$s_a$>0" which may neither be too small nor too big between the gap and strut 81.1*a* as well as between the gap and two-side retaining strut 81.2*a* in longitudinal direction. After projection through holes of clamping member 82*a* and fork-shaped wire holder 60.2 of belt wire 60.1 of seat belts 64, the blocking pin 60.3 is secured by two securing parts 60.4. After engagement of the retaining assembly, consisting of a pair of apertures and the two-side retaining strut, further movement of the clamping member 82*a* is blocked upon the contact of blocking pin 60.3 with the surface of retaining member 81*a* because its clearance of "$S_2$" is smaller than the clearance of "$s_1$" (FIG. 15). Site of predetermined fracture "b" is fractured by great impact energy to prevent strangulation of belted passengers and to limit the pre-tensioning force.

Figure 16:
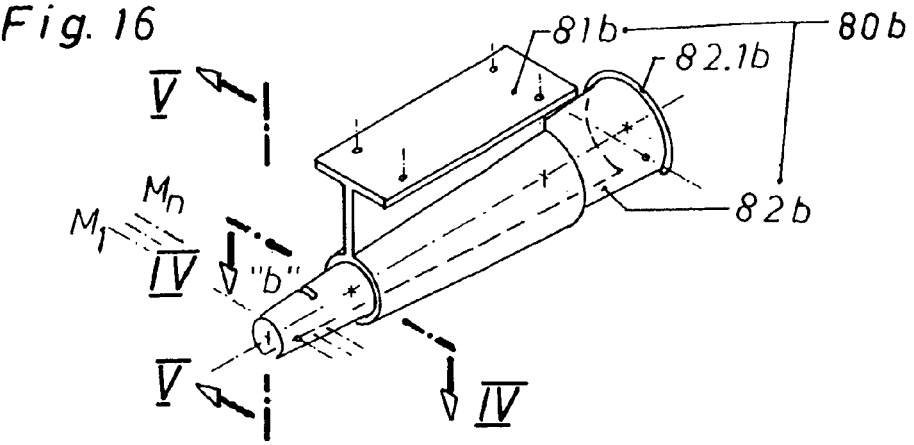
FIG. 16 is a schematic perspective view of a 4th embodiment of the energy-absorbing, vibration-dampening delimiter 80b.
Figure 17:
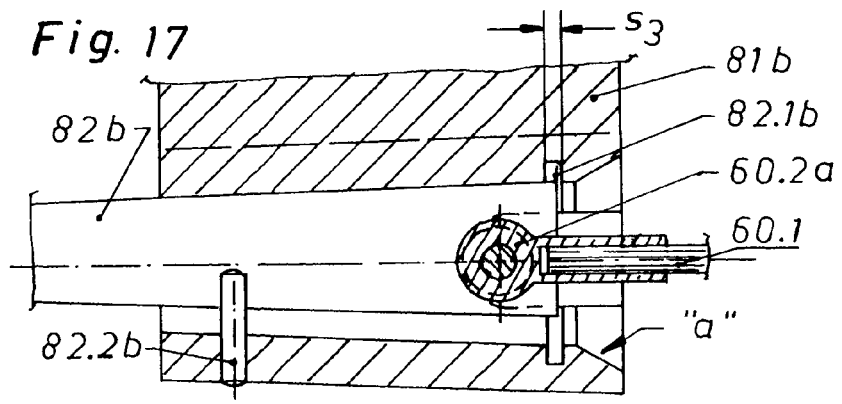
FIGS. 17 and 18 illustrate a cross-sectional view of a clamping member 82b of the delimiter 80b whose movement, guided by a guide pin 82.2b, is blocked by a retaining collar 82.1b in engagement with a retaining notch of retaining member 81b along the line IV—IV of FIG. 16.
Figure 18:
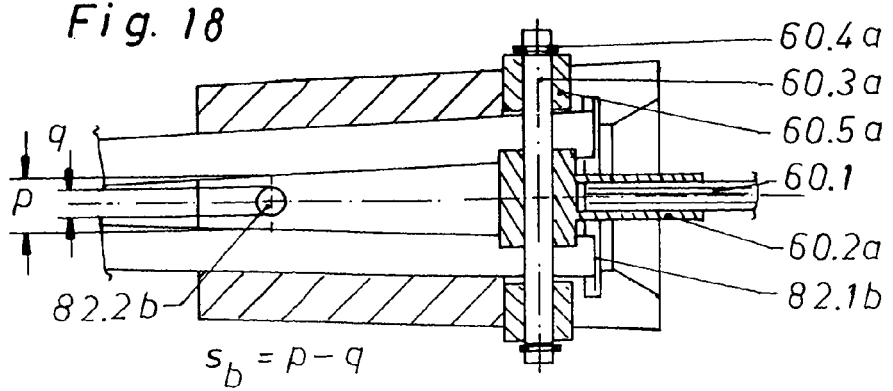

In the 4th embodiment the delimiter 80*b*, shown in FIGS. 16 to 18, comprises a contracting clamping member 82*b* and a retaining member 81*b*. After projection through holes of clamping member 82*b*, wire holder 60.2*a* of belt wire 60.1 and a pair of guide sleeves 60.5*a*, end projections of the blocking pin 60.3*a* are secured by two securing parts 60.4*a*.

Owing to a guide assembly, consisting of a guide pin 82.2*b* and a gap, the clamping member 82*b*, loosely guided by the guide pin, moves along the retaining member 81*b*. To maximize the clamping force of clamping member 82*b* moving along the retaining member 81*b*, a longitudinal gap "$S_B$" (not drawn) must be defined by the magnitude of longitudinal gap "$S_b$ >0" which may neither be too small nor too big between the gap and guide pin 82.2*b* in longitudinal direction.

A cone-shaped chamfer, denoted by "a", assists the process of engagement of a retaining assembly, consisting of retaining collar 82.1*b* of clamping member 82*b* and a retaining notch of retaining member 81*b*. After the engagement of retaining collar 82.1*b* with the retaining notch within a clearance of "$S_3$", further movement of the clamping member 82*b* is blocked upon the contact of the pair of guide sleeves 60.5*a* of blocking pin 60.3*a* with a pair of open notches of retaining member (FIGS. 17 and 18). Site of predetermined fracture "b" is fractured by great impact energy to prevent strangulation of belted passengers and to limit the pre-tensioning force.

In the 5th embodiment the delimiter 80*c*, shown in FIG. 19, comprises an expanding clamping member 82*c* without site of predetermined fracture, a retaining member 81*c*, retaining assembly, consisting of a pair of retaining apertures and two-side retaining strut 81.2*c* of strut 81.1*c*, and delimiter 51*c* with site of predetermined fracture "b". After projection through holes of clamping member 82*c*, fork-shaped wire holder 60.2*c* of pre-wire 60.1*c* and two guide sleeves 60.5*a*, the blocking pin 60.3*c* (similar to 60.3, hence not drawn) is secured by two securing parts 60.4*a*. The process to preserve the clamping force is similar to that of the 3rd embodiment.

In the 6th embodiment the delimiter 80*d*, shown in FIG. 20, comprises a contracting clamping member 82*d* without site of predetermined fracture, a retaining member 81*d*, retaining assembly, consisting of a retaining notch and retaining collar 82.1*d* of clamping member 82*d*, and delimiter 51*d* with site of predetermined fracture "b". After projection through holes of clamping member 82*d*, fork-shaped wire holder 60.2*d* of pre-wire 60.1*d* and two guide sleeves 60.5*a*, the blocking pin 60.3*d* (not drawn, similar to 60.3) is secured by two securing parts 60.4*a*. The process to preserve the clamping force is similar to that of the 4th embodiment.

In the 7th embodiment the most economical delimiter 80*e* without retaining and blocking parts, shown in FIG. 21, comprises an expanding or contracting clamping member 82*e* without site of predetermined fracture, a retaining member 81*e* and delimiter 51*e* with site of predetermined fracture "b".

As above-mentioned, the distance between blocking ring 60.7 and support plate 60.8 is adjusted by spacer 60.6 and the process to preserve the clamping force is similar to that of the previous embodiments.

In order to formulate in single terminology for Claims a generalized definition for the proper term is presented:

| Definition: | Proper Term: |
|---|---|
| "guide assembly" | guiding member (81.1, 81.1a, 82.2b) & guided member, such as gap etc. |
| "retaining assembly" | key (81.2a, 82.1b) & receptacle, such as a pair of retaining apertures, retaining notch etc. |
| "blocking assembly" | blocking member (60.3, 60.3a) & contacted member, such as surface of retaining member, a pair of open notches etc. |

Although the present invention has been described and illustrated in detail, it is clearly understood that the terminology used is intended to describe rather than limit. Many more objects, embodiments, features and variations of the present invention are possible in light of the above-mentioned teachings. Therefore, within the spirit and scope of the appended claims, the present invention may be practised otherwise than as specifically described and illustrated.

What is claimed is:

1. A safety device for a motor-vehicle steering column and seat belts, comprising a pair of bearing boxes, each of which is rigidly attached to a torque box and in a rear portion of a deformable longitudinal runner, facing a passenger compartment and having the greatest stiffness;

at least one pair of independently operating piston devices, each of which, arranged in a front section of a vehicle body, consists of a piston head, located in the vicinity of a front bumper, a wire-guiding member, connected to a deformable element, attached to the passenger compartment, and a piston rod, which, guided by the bearing box, is movable in the longitudinal runner, where the piston head and the wire-guiding member are fastened to front and rear portions of the piston rod;

a seat-belt wire, wound about pivots, attached to the torque box and a pair of side rails, and pivots of both wire-guiding members, where both ends of the seat-belt wire are connected to at least one pair of energy-absorbing, vibration-dampening delimiters, fastened to stiff motor-vehicle members, with sites of predetermined fracture in connection with the seat belts;

two steering-column wires, each of which, provided with a wire holder and an energy-absorbing steering-column delimiter with at least one site of predetermined fracture, is connected to the wire-guiding member and wound about pivots, and a collapsible casing, arranged between a collapsible upper portion of the steering column with a steering wheel and a non-collapsible lower portion thereof, attached to a dash panel, where the collapsible upper portion thereof has a threaded stud, which, accommodating both wire holders, has a threaded end projection onto which a nut is bolted to secure them;

whereby in the event of a front collision an impact energy displaces the front bumper and at least one piston head, a movement of which results in deforming the respective longitudinal runner, loosely guided by the piston rod, and deflecting the respective wire-guiding member in association with deforming the deformable element, the respective energy-absorbing, vibration-dampening delimiter and the energy-absorbing steering-column delimiter and collapsing the collapsible upper portion of the steering column with the steering wheel;

absorbing the impact energy and dampening a vibration;

releasing the respective steering-column wire and pre-tensioning the seat belts of belted passengers up to a predetermined length of a seat-belt retraction.

2. The safety device according to claim 1, further comprising a cone-shaped hub, which, facing the longitudinal runner, is provided for each piston head, whereby in the event of the front collision at least one piston head deforms the deformable longitudinal runner, the wire-guiding member deforms the deformable element and the energy-absorbing steering-column delimiter and the respective hub reams the longitudinal runner, during which the piston rod, guided by the respective bearing box and the hub, loosely guides the longitudinal runner thereby preventing buckling;

achieving the highest efficiency in absorbing the impact energy and dampening the vibration.

3. The safety device according to claim 2, wherein the delimiter of the seat belts consists of a spring, shock absorber and delimiting unit, comprising a support member with a plate, biased by a spring, and a tube, which, movable in the support member and provided with a notch, at least one site of predetermined fracture and a number of adjusting holes, is moved by a tension force of the seat-belt wire until the biased plate snaps into the notch to block further movement and limit retraction-lengths of the seat belts, where when the tension force is great the site of predetermined fracture is fractured and the seat-belt wire is released.

4. A safety device for a motor-vehicle steering column and seat belts, comprising at least one pair of independently operating piston devices, each of which, arranged in a front section of a vehicle body, has a piston rod, which, arranged to a longitudinal runner, has a front portion, fastened to a front portion of the longitudinal runner, a mid-portion, loosely guided by a bearing of a dash panel, reinforced, and a rear portion, to which a wire-guiding member is fastened, where the bearing is provided with a soundproofing bush;

a seat-belt wire, wound about pivots, attached to a torque box and a pair of side rails, and pivots of both wire-guiding members, where both ends of the seat-belt wire are connected to at least one pair of energy-absorbing, vibration-dampening delimiters, fastened to stiff motor-vehicle members, with sites of predetermined fracture in connection with the seat belts;

two steering-column wires, each of which, provided with a wire holder and an energy-absorbing steering-column delimiter with at least one site of predetermined fracture, is connected to the wire-guiding member and wound about pivots, and a collapsible casing, arranged between a collapsible upper portion of the steering column with a steering wheel and a non-collapsible lower portion thereof, attached to a dash panel and the torque box, where the collapsible upper portion thereof has a threaded stud, which, accommodating both wire holders, has a threaded end projection onto which a nut is bolted to secure them;

whereby in the event of a mid-front collision an impact energy displaces the front bumper and both piston heads, a movement of which results in deforming both longitudinal runners and deflecting both wire-guiding members in association with deforming both energy-absorbing, vibration-dampening delimiters and both energy-absorbing steering-column delimiters and collapsing the collapsible upper portion of the steering column with the steering wheel;

absorbing the impact energy and dampening a vibration;

releasing both steering-column wires and pre-tensioning the seat belts of belted passengers up to a predetermined length of a seat-belt retraction.

5. The safety device according to claim 4, wherein a number of adjusting holes is distributed along the rear portion of the piston rod.

6. The safety device according to claim 5, wherein the wire-guiding member has a longitudinal hole to accommodate the rear portion of the piston rod, to which the wire-guiding member and the wire holder of the steering-column wire are fastened by a fastener, and a web with a transverse hole, serving as the pivot of the seat-belt wire.

7. A safety device for a motor-vehicle steering column and seat belts, comprising at least one pair of independently operating piston devices, each of which, arranged in a front section of a vehicle body, has a piston rod, which, arranged to a longitudinal runner, has a front portion, fastened to a front portion of the longitudinal runner, a mid-portion, loosely guided by a soundproofing bearing of a dash panel, reinforced, and a rear portion, to which a wire-guiding member is fastened;

a seat-belt wire, wound about pivots, attached to a torque box and a pair of side rails, and pivots of both wire-guiding members, where both ends of the seat-belt wire are connected to at least one pair of energy-absorbing, vibration-dampening delimiters, fastened to stiff motor-vehicle members, with sites of predetermined fracture in connection with the seat belts;

two steering-column wires, each of which, provided with a wire holder and an energy-absorbing steering-column delimiter with at least one site of predetermined fracture, is connected to the wire-guiding member and wound about pivots, and a collapsible casing, arranged between a collapsible upper portion of the steering column with a steering wheel and a non-collapsible lower portion thereof, attached to the dash panel and the torque box, where the collapsible upper portion thereof has a threaded stud, which, accommodating both wire holders, has a threaded end projection onto which a nut is bolted to secure them;

whereby in the event of a front collision an impact energy displaces the front bumper and at least one piston head, a movement of which results in deforming the respective longitudinal runner, loosely guided by the piston rod, and deflecting the respective wire-guiding member in association with deforming the deformable element, the respective energy-absorbing, vibration-dampening delimiter and the energy-absorbing steering-column delimiter and collapsing the collapsible upper portion of the steering column with the steering wheel;

absorbing the impact energy and dampening a vibration;

releasing the respective steering-column wire and pre-tensioning the seat belts of belted passengers up to a predetermined length of a seat-belt retraction.

8. The safety device according to claim 7, further comprising a guide assembly, a retaining assembly and a blocking assembly, each assembly consists of a guiding member and a mating longitudinally guided member, of a key and a mating receptacle and of a contacted member and a mating blocking member, each of all three members and each of all three mating members are provided for a retaining member and a mating clamping member of the delimiter of the seat belts, where the mating clamping member is provided with at least one site of predetermined fracture and with a number of adjusting holes and a pre-wire of the seat belts and the seat-belt wire are connected to free rear and free front portions;

whereby in the event of the front collision the seat-belt wire, loaded, pulls the mating clamping member, a movement of which, guided by the guiding member, along the retaining member, fastened to the stiff motor-vehicle member, results in engaging the key with the mating receptacle and contacting the contacted member with the mating blocking member;

absorbing the impact energy, dampening the vibration and releasing the seat-belt wire in association with a work of deformation and friction and fracturing the site of predetermined fracture and preserving a clamping force of the clamping member and retraction-lengths of the seat belts.

9. The safety device according to claim 8, wherein a longitudinal gap serves as the longitudinally guided member of the clamping member, which, pre-loaded, arranged on the retaining member with a longitudinal strut, serving as the guiding member.

10. The safety device according to claim 9, wherein a contact area of the portion of the retaining member is surrounded by a soundproofing material.

11. The safety device according to claim 10, wherein a pair of retaining apertures on the longitudinal gap of the clamping member serves as the receptacle and a two-side retaining strut on a longitudinal strut of the retaining member serves as the key.

12. The safety device according to claim 11, wherein a blocking pin, serving as the blocking member, projects through a rear portion of the clamping member and a fork-shaped wire holder of the pre-wire of the seat belts and both end projections are secured by securing parts and a surface of the retaining member, facing the blocking pin, serves as the contacted member, where the blocking assembly with a clearance of ($s_2$) and the retaining assembly with a clearance of ($s_1$), which is bigger than ($s_2$), are in engagement thereby facilitating a blocking operation while maintaining a retaining condition upon further movement of the clamping member under load of the impact energy, when great, to release the seat-belt wire in association with fracturing the site of predetermined fracture and to preserve the clamping force of the clamping member and the predetermined length of the seat-belt retraction.

13. The safety device according to claim 12, wherein the clamping member, when moving along the retaining member, expands.

14. The safety device according to claim 13, wherein portions of the clamping member and the retaining member, which are in contact, are defined by conical forms which are similar.

15. The safety device according to claim 8, wherein a longitudinal gap serves as the longitudinally guided member of the clamping member, which, pre-loaded, arranged in the retaining member with a guide pin, serving as the guiding member.

16. The safety device according to claim 15, wherein a contact area of the portion of the clamping member is surrounded by a soundproofing material.

17. The safety device according to claim 16, wherein a retaining collar on the rear end of the clamping member serves as the key and the retaining member is provided with a retaining notch, serving as the receptacle, and a cone-shaped chamfer at an end portion to assist a process of engaging the retaining collar with the retaining notch.

18. The safety device according to claim 17, wherein a pair of open notches of the retaining member serves as the contacted member to receive a pair of guide sleeves of a blocking pin, where the blocking pin, projecting through the rear portion of the clamping member, a wire holder of the pre-wire of the seat belts and the pair of guide sleeves, serving as the blocking member, on the clamping member, has end projections, secured by securing parts, where the blocking assembly and the retaining assembly with a clearance of ($s_3$) are in engagement thereby facilitating a blocking operation while maintaining a state of retaining upon further movement of the clamping member under load of the impact energy, when great, to release the seat-belt wire in association with fracturing the site of predetermined fracture and to preserve the clamping force of the clamping member and the retraction-lengths of the seat belts.

19. The safety device according to claim 18, wherein the clamping member, when moving along the retaining member, contracts.

20. The safety device according to claim 19, wherein portions of the clamping member and the retaining member, which are in contact, are defined by conical forms which are similar.

21. The safety device according to claim 7, wherein a number of adjusting holes is distributed along the front and rear portions of the piston rod.

22. The safety device according to claim 21, wherein the steering-column delimiter comprises a support plate with an aperture, a tube with at least one site of predetermined fracture and with a number of adjusting holes and a blocking member, which, projecting through a transverse hole of the rear portion of the tube, has end projections, secured thereon by securing parts, where a fracture occurs when a deflection of the delimiter exceeds a distance between the blocking member, bigger than the aperture of the support plate, and the support plate, fixed to the stiff motor-vehicle member.

23. The safety device according to claim 22, wherein the rear portion of the piston rod is fastened to a longitudinal hole of the wire-guiding member, which has a web with a transverse hole, serving as the pivot of the seat-belt wire, and another longitudinal hole to accommodate the steering-column delimiter, an appropriate adjusting hole of which is occupied by the wire holder of the steering-column wire.

24. The safety device according to claim 7, wherein the delimiters of the seat belts and steering column are plates, where a mid-portion of each plate is provided with at least one site of predetermined fracture, a front portion has a number of adjusting holes, one of which is occupied by a first delimiter-wire, and a rear portion has a number of adjusting holes, one of which is occupied by a second delimiter-wire.

25. The safety device according to claim 24, wherein the first delimiter-wire is movable with the wire-guiding member and the second delimiter-wire, inserted into a hole of a stiff holder, fastened to the stiff motor-vehicle member, has a blocking member, a distance between which and the hole thereof is adjusted by clamping a spacer with open profile and an appropriate length onto the second delimiter-wire.

26. A safety device for a motor-vehicle steering column and seat belts, comprising
 a pair of bearing boxes, each of which is rigidly attached to a torque box and in a front portion of a deformable longitudinal runner, facing a passenger compartment and having the greatest stiffness;
 at least one pair of independently operating piston devices, each of which, arranged in a rear section of a vehicle body, consists of a piston head, located in the vicinity of a rear bumper, a wire-guiding member, connected to a deformable element, attached to the passenger compartment, and a piston rod, which, guided by the bearing box, is movable in the longitudinal runner, where the piston head and the wire-guiding member are fastened to rear and front portions of the piston rod;
 a seat-belt wire, wound about pivots, attached to a torque box and a pair of side rails, and pivots of both wire-guiding members, where both ends of the seat-belt wire are connected to at least one pair of energy-absorbing, vibration-dampening delimiters, fastened to stiff motor-vehicle members, with sites of predetermined fracture in connection with the seat belts;
 two steering-column wires, each of which, provided with a wire holder and an energy-absorbing steering-column delimiter with at least one site of predetermined fracture, is connected to the wire-guiding member and wound about pivots, and
 a collapsible casing, arranged between a collapsible upper portion of the steering column with a steering wheel and a non-collapsible lower portion thereof, attached to a dash panel, where the collapsible upper portion thereof has a threaded stud, which, accommodating both wire holders, has a threaded end projection onto which a nut is bolted to secure them;
 whereby in the event of a rear collision an impact energy displaces the rear bumper and at least one piston head, a movement of which results in
 deforming the respective longitudinal runner, loosely guided by the piston rod, and deflecting the respective wire-guiding member in association with deforming the deformable element, the respective energy-absorbing, vibration-dampening delimiter and the energy-absorbing steering-column delimiter and collapsing the collapsible upper portion of the steering column with the steering wheel;
 absorbing the impact energy and dampening a vibration;
 releasing the respective steering-column wire and
 pre-tensioning the seat belts of belted passengers up to a predetermined length of a seat-belt retraction.

27. A safety device for a motor-vehicle steering column and seat belts, comprising
 at least one pair of independently operating piston devices, each of which, arranged in a rear section of a vehicle body, has a piston rod, which, arranged to a longitudinal runner, has a rear portion, fastened to a rear portion of the longitudinal runner, a mid-portion, loosely guided by a bearing of a rear panel of a passenger compartment, reinforced, and a front portion, to which a wire-guiding member is fastened, where the bearing is provided with a soundproofing bush;
 a seat-belt wire, wound about pivots, attached to a torque box and a pair of side rails, and pivots of both wire-guiding members, where both ends of the seat-belt wire are connected to at least one pair of energy-absorbing, vibration-dampening delimiters, fastened to stiff motor-vehicle members, with sites of predetermined fracture in connection with the seat belts;
 two steering-column wires, each of which, provided with a wire holder and an energy-absorbing steering-column delimiter with at least one site of predetermined fracture, is connected to the wire-guiding member and wound about pivots, and
 a collapsible casing, arranged between a collapsible upper portion of the steering column with a steering wheel and a non-collapsible lower portion thereof, attached to a dash panel and the torque box, where the collapsible upper portion thereof has a threaded stud, which, accommodating both wire holders, has a threaded end projection onto which a nut is bolted to secure them;
 whereby in the event of a mid-rear collision an impact energy displaces the rear bumper and both piston heads, a movement of which results in
 deforming both longitudinal runners and deflecting both wire-guiding members in association with deforming both energy-absorbing, vibration-dampening delimiters and both energy-absorbing steering-column delimiters and collapsing the collapsible upper portion of the steering column with the steering wheel;
 absorbing the impact energy and dampening a vibration;
 releasing both steering-column wires and
 pre-tensioning the seat belts of belted passengers up to a predetermined length of a seat-belt retraction.

28. A safety device for a motor-vehicle steering column and seat belts, comprising
 at least one pair of independently operating piston devices, each of which, arranged in a rear section of a vehicle body, has a piston rod, which, arranged to a longitudinal runner, has a rear portion, fastened to a rear portion of the longitudinal runner, a mid-portion, loosely guided by a soundproofing bearing of a rear panel of a passenger compartment, reinforced, and a front portion, to which a wire-guiding member is fastened;

a seat-belt wire, wound about pivots, attached to a torque box and a pair of side rails, and pivots of both wire-guiding members, where both ends of the seat-belt wire are connected to at least one pair of energy-absorbing, vibration-dampening delimiters, fastened to stiff motor-vehicle members, with sites of predetermined fracture in connection with the seat belts;

two steering-column wires, each of which, provided with a wire holder and an energy-absorbing steering-column delimiter with at least one site of predetermined fracture, is connected to the wire-guiding member and wound about pivots, and a collapsible casing, arranged between a collapsible upper portion of the steering column with a steering wheel and a non-collapsible lower portion thereof, attached to the dash panel and the torque box, where the collapsible upper portion thereof has a threaded stud, which, accommodating both wire holders, has a threaded end projection onto which a nut is bolted to secure them;

whereby in the event of a rear collision an impact energy displaces the rear bumper and at least one piston head, a movement of which results in deforming the respective longitudinal runner, loosely guided by the piston rod, and deflecting the respective wire-guiding member in association with deforming the deformable element, the respective energy-absorbing, vibration-dampening delimiter and the energy-absorbing steering-column delimiter and collapsing the collapsible upper portion of the steering column with the steering wheel;

absorbing the impact energy and dampening a vibration;

releasing the respective steering-column wire and pre-tensioning the seat belts of belted passengers up to a predetermined length of a seat-belt retraction.

29. The safety device according to claim 26, further comprising a cone-shaped hub, which, facing the longitudinal runner, is provided for each piston head, whereby in the event of the rear collision at least one piston head deforms the deformable longitudinal runner, the wire-guiding member deforms the deformable element and the energy-absorbing steering-column delimiter and the respective hub reams the longitudinal runner during which the piston rod, guided by the respective bearing box and the hub, loosely guides the longitudinal runner thereby preventing buckling;

achieving the highest efficiency in absorbing the impact energy and dampening the vibration.

30. The safety device according to claim 29, wherein the delimiter of the seat belts consists of a spring, shock absorber and delimiting unit, comprising a support member with a plate, biased by a spring, and a tube, which, movable in the support member and provided with a notch, with at least one site of predetermined fracture and a number of adjusting holes, is moved by a tension force of the seat-belt wire until the biased plate snaps into the notch to block further movement and limit retraction-lengths of the seat belts, where when the tension force is great the site of predetermined fracture is fractured and the seat-belt wire is released.

31. The safety device according to claim 28, further comprising a guide assembly, a retaining assembly and a blocking assembly, each assembly consists of a guiding member and a mating longitudinally guided member, of a key and a mating receptacle and of a contacted member and a mating blocking member, each of all three members and each of all three mating members are provided for a retaining member and a mating clamping member of the delimiter of the seat belts, where the clamping member is provided with at least one site of predetermined fracture and with a number of adjusting holes and a pre-wire of the seat belts and the seat-belt wire are connected to free rear and free front end portions;

whereby in the event of the rear collision the seat-belt wire, loaded, pulls the clamping member, a movement of which, guided by the guiding member, along the retaining member, fastened to the stiff motor-vehicle member, results in engaging the key with the mating receptacle and contacting the contacted member with the mating blocking member;

absorbing the impact energy, dampening the vibration and releasing the seat-belt wire in association with a work of deformation and friction and fracturing the site of predetermined fracture and preserving a clamping force of the clamping member and retraction-lengths of the seat belts.

* * * * *